(12) United States Patent
Blake et al.

(10) Patent No.: US 11,780,016 B2
(45) Date of Patent: Oct. 10, 2023

(54) ERGONOMIC ATTACHMENT FOR AN ANGULAR DRILL ASSEMBLY

(71) Applicant: THE BOEING COMPANY, Chicago, IL (US)

(72) Inventors: Ryan L. Blake, Kirkland, WA (US); Ryan D. Jennings, Brier, WA (US)

(73) Assignee: The Boeing Company, Chicago, IL (US)

( * ) Notice: Subject to any disclaimer, the term of this patent is extended or adjusted under 35 U.S.C. 154(b) by 535 days.

(21) Appl. No.: 16/698,526

(22) Filed: Nov. 27, 2019

(65) Prior Publication Data
US 2020/0384549 A1    Dec. 10, 2020

Related U.S. Application Data

(63) Continuation-in-part of application No. 16/433,456, filed on Jun. 6, 2019, now Pat. No. 11,633,846.

(51) Int. Cl.
*B23B 45/00* (2006.01)

(52) U.S. Cl.
CPC .......... *B23B 45/003* (2013.01); *B23B 45/001* (2013.01)

(58) Field of Classification Search
CPC ..... B23B 45/003; B23B 45/001; B25B 23/00; B25B 23/08; B25B 23/16; B25G 1/002; B25G 1/102; B25G 3/34
USPC ..... 81/52, 58.2, 180.1, 185.2, 489, 491, 492
See application file for complete search history.

(56) References Cited

U.S. PATENT DOCUMENTS

| 4,136,579 A * | 1/1979 | Robinson | B25H 1/0057 |
| | | | 408/72 R |
| 7,191,494 B2 * | 3/2007 | Badiali | B25F 5/026 |
| | | | 16/436 |

* cited by examiner

*Primary Examiner* — Lee D Wilson
*Assistant Examiner* — Alberto Saenz
(74) *Attorney, Agent, or Firm* — Quinn IP Law (57) ABSTRACT

A removable attachment assembly for an angular drill assembly, which includes a base member and a securement assembly secured to the base member for releasably securing the base member to a housing of the angular drill assembly. The removable attachment assembly further includes a cushion member associated with the base member.

26 Claims, 12 Drawing Sheets

ERGONOMIC ATTACHMENT FOR AN ANGULAR DRILL ASSEMBLY

CROSS-REFERENCE TO RELATED APPLICATION

This application is a continuation-in-part of U.S. patent application Ser. No. 16/433,456, entitled "Ergonomic Attachment for a Ninety Degree Drill Assembly" and filed Jun. 6, 2019, now U.S. Pat. No. 11,633,846 issued on Apr. 25, 2023, the entire disclosure of which is incorporated by reference herein.

FIELD

This disclosure relates to an attachment for a hand tool and more particularly to an attachment to an angular drill assembly.

BACKGROUND

Angular drill assemblies are used in fabrication of many structures such as for example an aircraft. In angular drill assemblies, drill bits extend away from a main housing of the drill in angular relationship to the housing. The angular relationship includes, for example, ninety (90) degrees and forty-five (45) degrees. The operator of the ninety degree drill assembly will often utilize the palm of their hand to press against the housing of the drill assembly during the drilling operation. The palm of the operator's hand applies a force against the housing of the drill assembly which in turn transmits the force along the drill bit urging the drill bit in a direction of cutting a hole through a material. The operator in applying this force and particularly in a repetitive manner, can experience some discomfort in the use of the ninety degree drill assembly. Since gloves, for safety purposes are not always approved for use with a rotary tool or rotary device, there is a need to cushion the operator's hand from the force experienced by the operator's palm urging the housing of the ninety-degree drill assembly and in turn the drill bit in cutting the hole through material.

In addition, with the drill bit of a ninety-degree drill assembly extending ninety degrees from the main housing body of the drill assembly, wherein the main housing of the main body contains the motor of the drill assembly, the removal of the drill bit from a drilling position often involves the drill bit to be backed off in an opposing direction of that of the drilling direction. The backing off movement of the drill bit, out of an operational drilling position, can result in the housing of the ninety-degree drill assembly colliding with another surface of the structure being fabricated, particularly when operating in confined locations. The surface impacted by the drill assembly can result in the surface impacted being marred or damaged resulting in a need to repair that surface.

The housing of the ninety-degree drill assembly is constructed of a hard material such as metal. Movement of the drilling assembly within the structure being fabricated can result in the housing of the drill assembly colliding with the structure being fabricated or even by way of dropping the drilling assembly within the structure resulting in marring or damaging a surface of the structure being fabricated. Should the surface impacted include a finished surface, the finished surface will need to be repaired and refinished. As a result, there is also a need to protect surfaces of the structure being fabricated from collisions with respect to the housing of the ninety degree drilling assembly so as to reduce the occurrence of marring and/or damage to a surface of the structure being fabricated.

In other angular drill assemblies, such as a forty five degree drill assembly, the drill bit extends angularly from the housing in a forty five degree angle. The operator has difficulty, with the drill assembly in operation, in urging the drill bit in a direction perpendicular to the surface being drilled. This is particularly challenging with operating the drill assembly within confined locations.

The operator in utilizing a forty five degree drill assembly similarly applies a force in urging the drill bit during operation with a palm or other portions of the hand. This urging, particularly in a repetitive manner, can cause the operator to experience some discomfort in the use of the forty five degree drill assembly. Since gloves, for safety purposes, as mentioned earlier, are not always approved for use with a rotary tool or rotary device, as a result, there is a need to cushion the operator's hand in using the drill assembly.

As earlier mentioned with respect to the ninety degree drilling assembly, similar protection is needed to protect surfaces of the structure being fabricated from impacts incurred by the drilling assembly. These impacts, as earlier mentioned, can arise from backing out of the drill bit from a drilling operation, the drilling assembly being moved around within the structure being fabricated and from the drill assembly being dropped within the structure being fabricated. As a result, there is a similar need with respect to the forty five degree drill assembly to reduce the occurrence of damaging or marring surfaces in the structure being fabricated.

SUMMARY

An example includes a removable attachment assembly for an angular drill assembly, which includes a base member and a securement assembly secured to the base member for releasably securing the base member to a housing of the angular drill assembly; and a cushion member associated with the base member.

An example includes a method for installing a removable attachment assembly to a ninety degree drill assembly, which includes a step of securing a base member to a housing of the ninety degree drill assembly with a securement assembly, wherein the securement assembly is secured to the base member and a cushion member is secured to the base member such that the cushion member has a surface which faces in a direction away from the housing.

The features, functions, and advantages that have been discussed can be achieved independently in various embodiments or may be combined in yet other embodiments further details of which can be seen with reference to the following description and drawings.

DESCRIPTION

Figure 10:
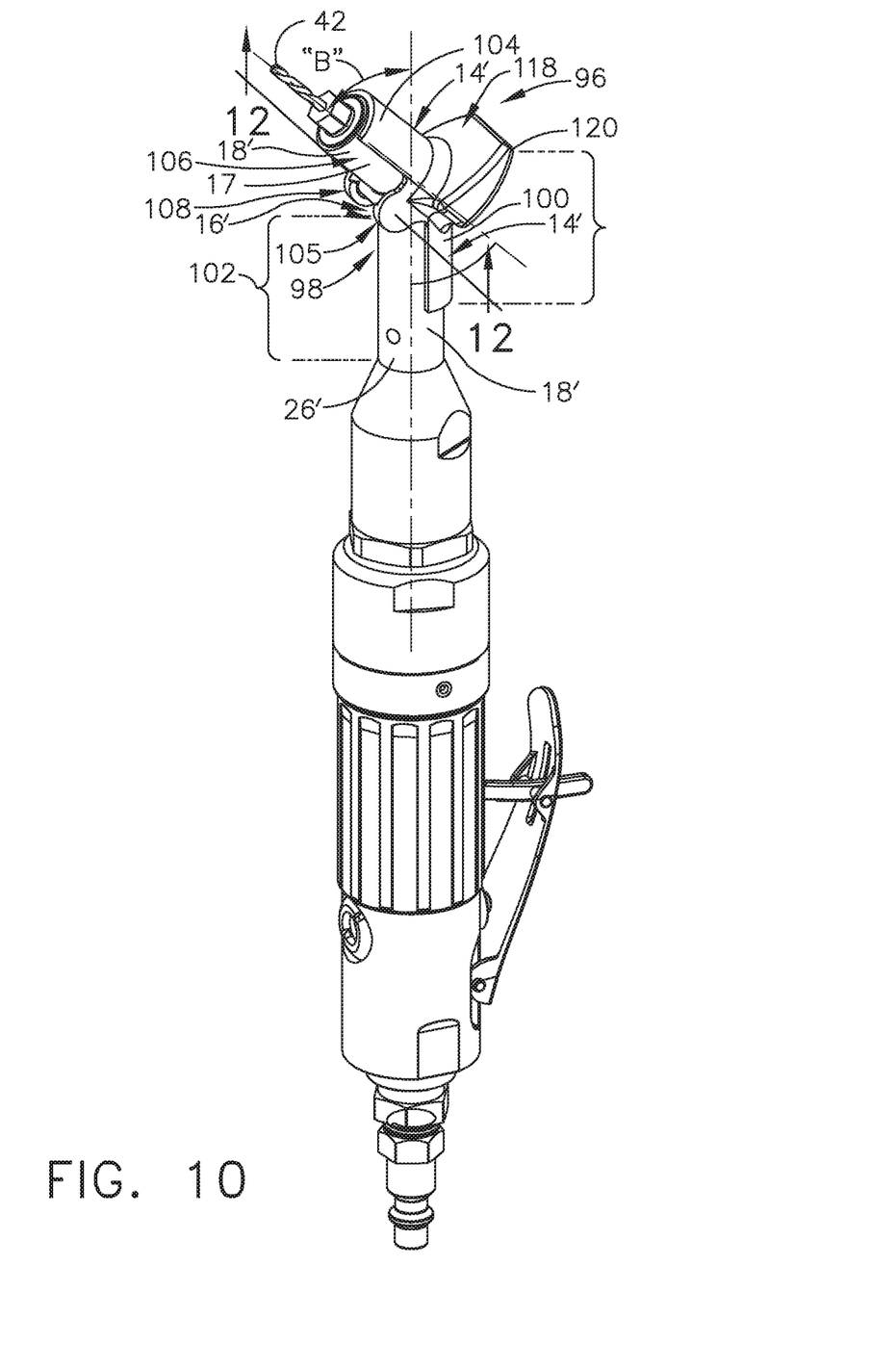
FIG. 10 is a side perspective elevation view of an angular drill assembly, being a forty five degree drill assembly, with a second example of a removable attachment assembly secured to the forty five degree drill assembly.
Figure 11:
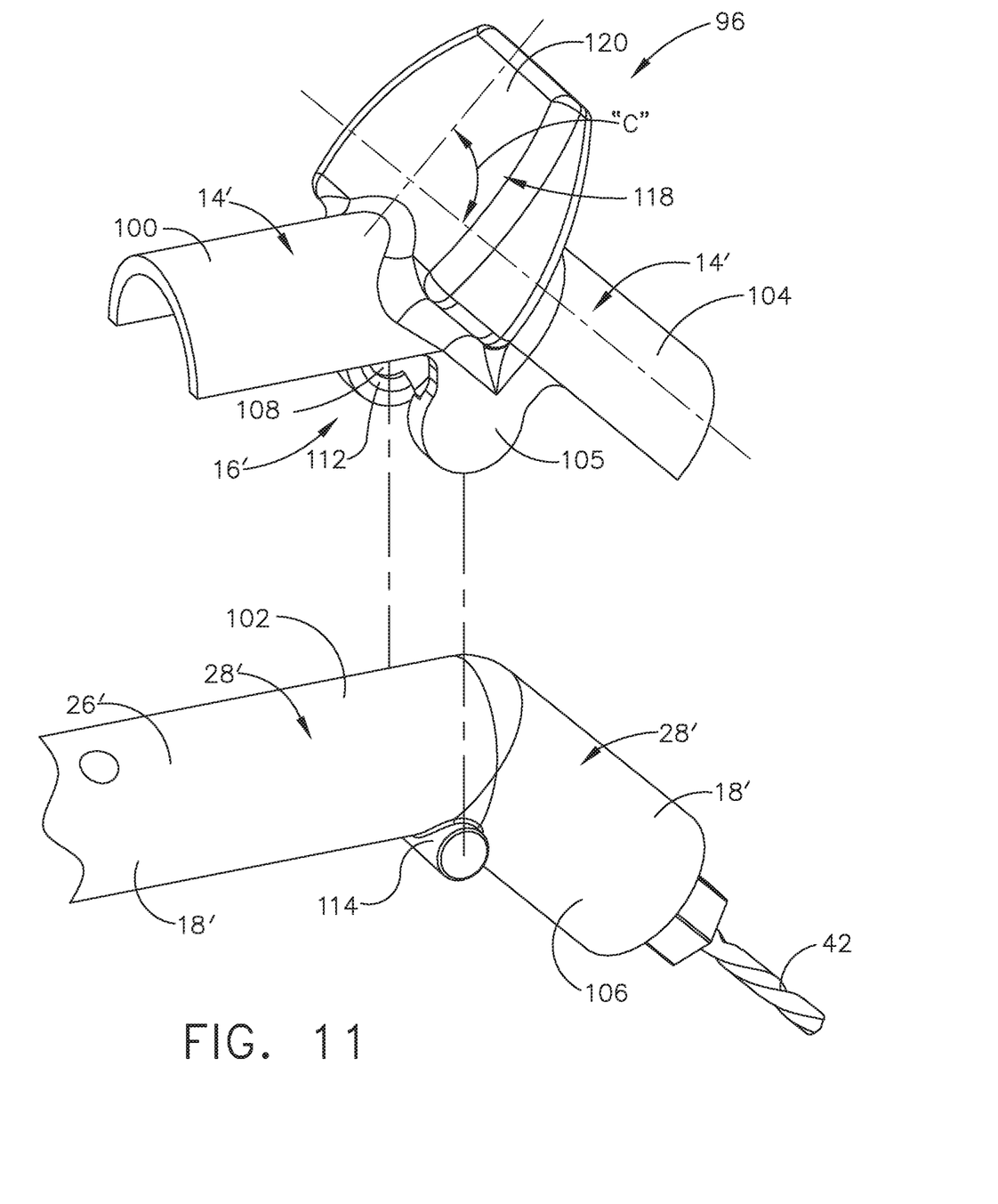
FIG. 11 is an enlarged exploded partial perspective view of the second example of the removable attachment assembly and the forty five degree drill assembly.
Figure 12:
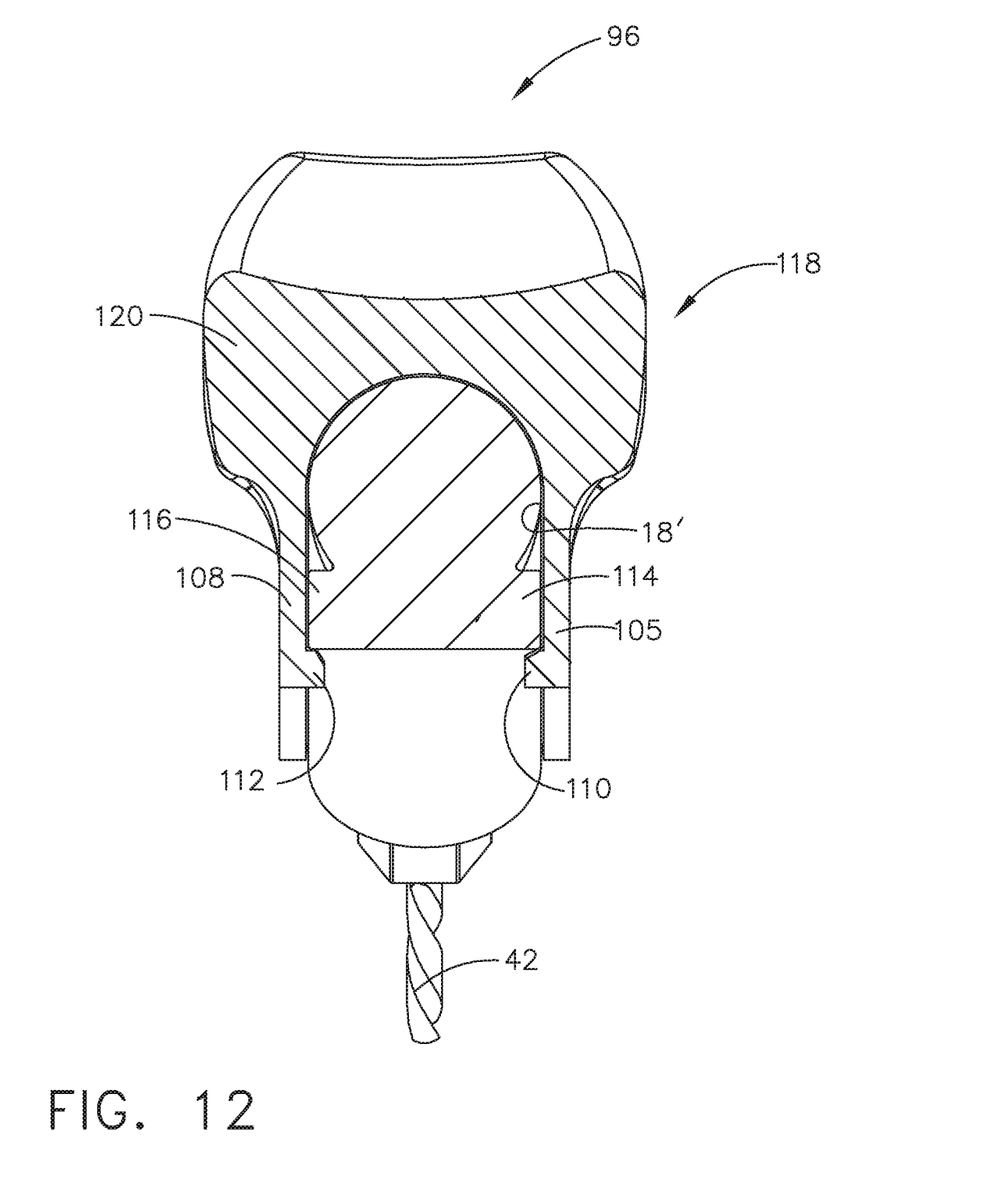
FIG. 12 is a cross section along line 12-12 of FIG. 10.

Examples of removable attachment assemblies for an angular drill assembly will be discussed herein. Angular drill assemblies have an angular relationship between a drill bit and a main housing of the angular drill assembly. The amount of angular relationship can vary. In this discussion a first example of a removable attachment assembly 10 will be associated with a ninety degree drill assembly 12, as seen in FIGS. 1-8. A second example of a removable attachment assembly 96 will be associated with a forty five degree drill assembly 98, as seen in FIGS. 10-12.

Figure 6:
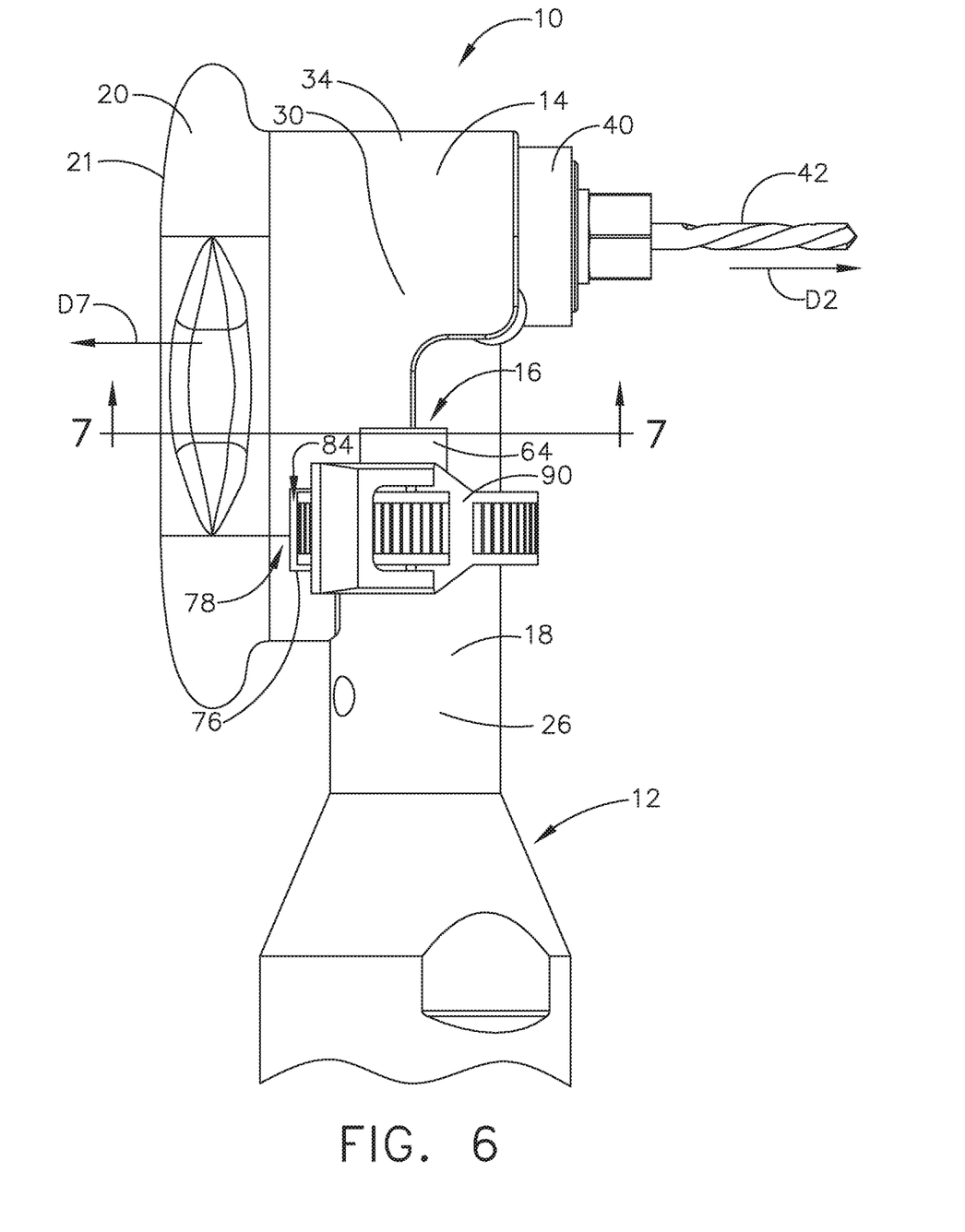
FIG. 6 is a partial enlarged side elevation view of the removable attachment assembly secured to the ninety-degree drill assembly with a zip tie additionally securing the removable attachment assembly to the ninety-degree drill assembly.
Figure 7:
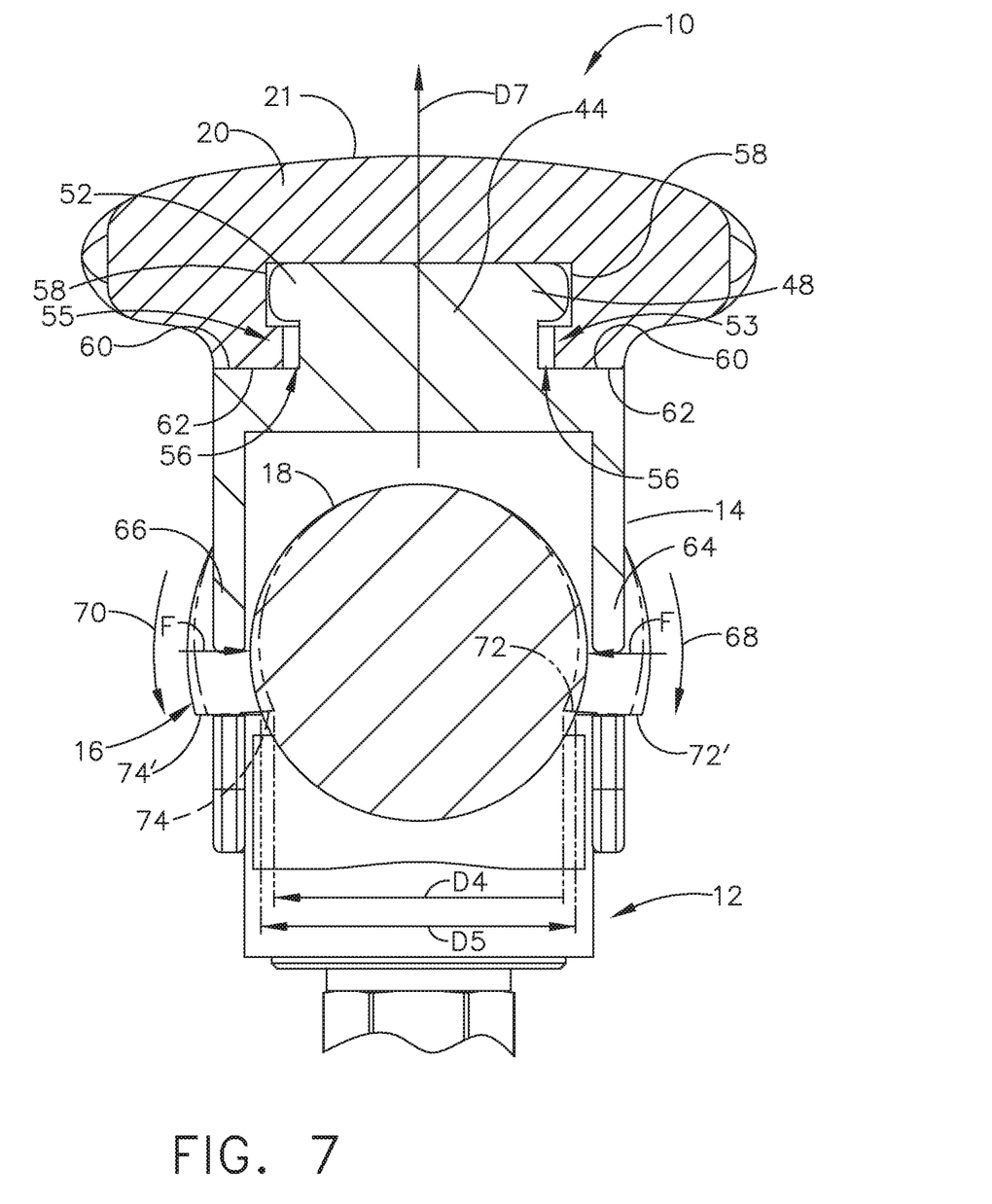
FIG. 7 is an enlarged cross section view along line 7-7 of FIG. 6.
Figure 8:
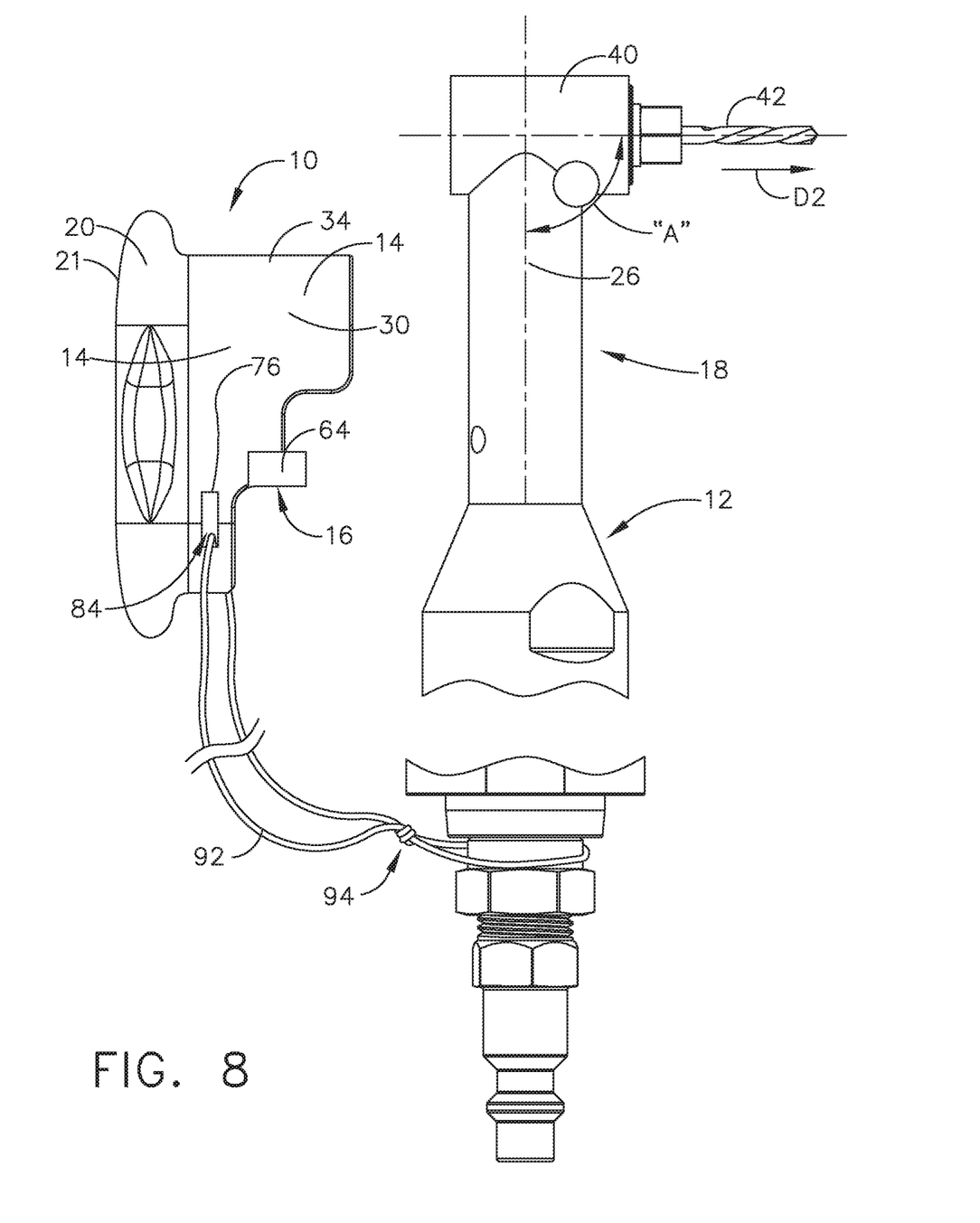
FIG. 8 is an enlarged partial side elevation view of the ninety-degree drill assembly with the removable attachment assembly removed from securement to the ninety-degree drill assembly and tethered to the ninety-degree drill assembly.

In referring to FIGS. 1-8 removable attachment assembly 10 for a ninety degree drill assembly 12 includes base member 14 and securement assembly 16 secured to base member 14 for releasably securing base member 14 to housing 18 of ninety degree drill assembly 12, wherein drill bit 42 extends away from housing 18 in a ninety-degree angle represented as angle "A" as seen in FIG. 8. Releasable securement of base member 14 to housing 18 includes attachment and removal of base member 14 with respect to housing 18 without need of a tool. Removable attachment assembly 10 further includes cushion member 20 secured to base member 14.

Figure 1:
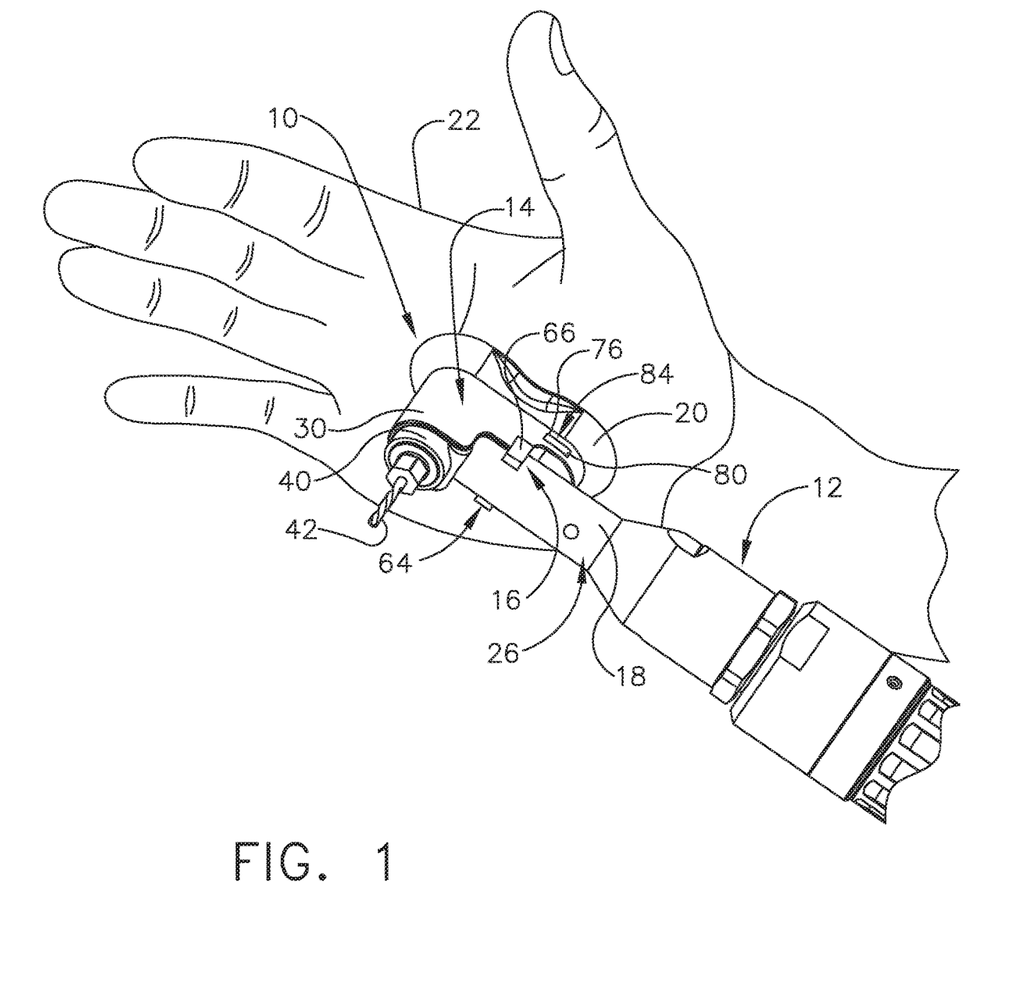
FIG. 1 is a partial perspective view of an angular drill assembly, being a ninety-degree drill assembly, with a first example of a removable attachment assembly secured to the angular drill assembly and with a user's hand positioned on the removable attachment assembly.

Base member 14 facilitates alignment and mounting of removable attachment assembly 10 onto ninety degree drill assembly 12 such that cushion member 20, with ninety degree drill assembly 12 in operation, is positioned to contact hand 22 of operator, as seen in FIG. 1. Additionally, securement assembly 16 is secured to base member 14 which secures removable attachment assembly 10 to housing 18 of ninety degree drill assembly 12.

Figure 3:
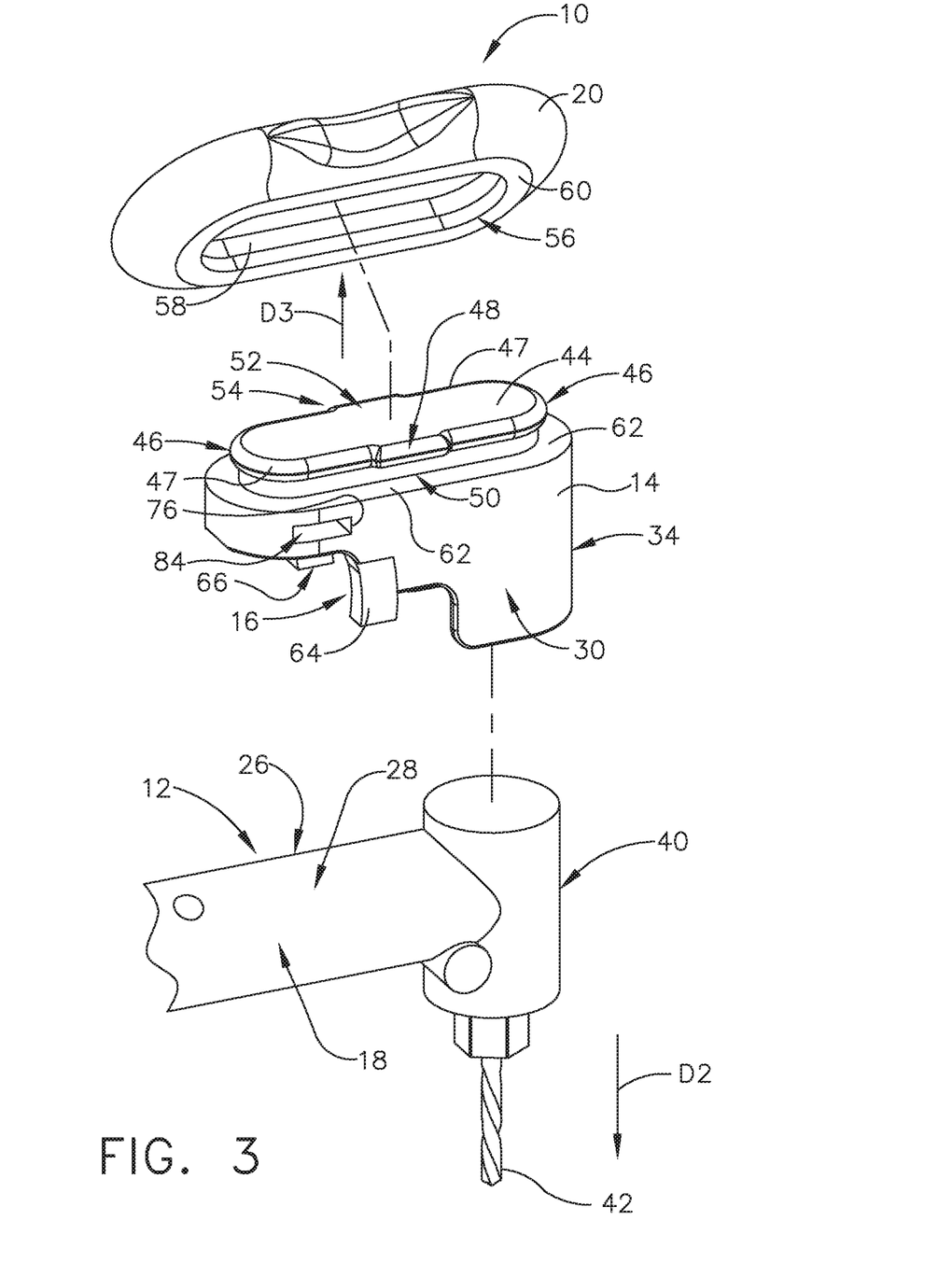
FIG. 3 is an enlarged exploded view of the removable attachment assembly and a portion of the ninety degree drill assembly, with a cushion member of the removable attachment assembly tilted out of securement alignment with a base member of the removable attachment assembly.
Figure 4:
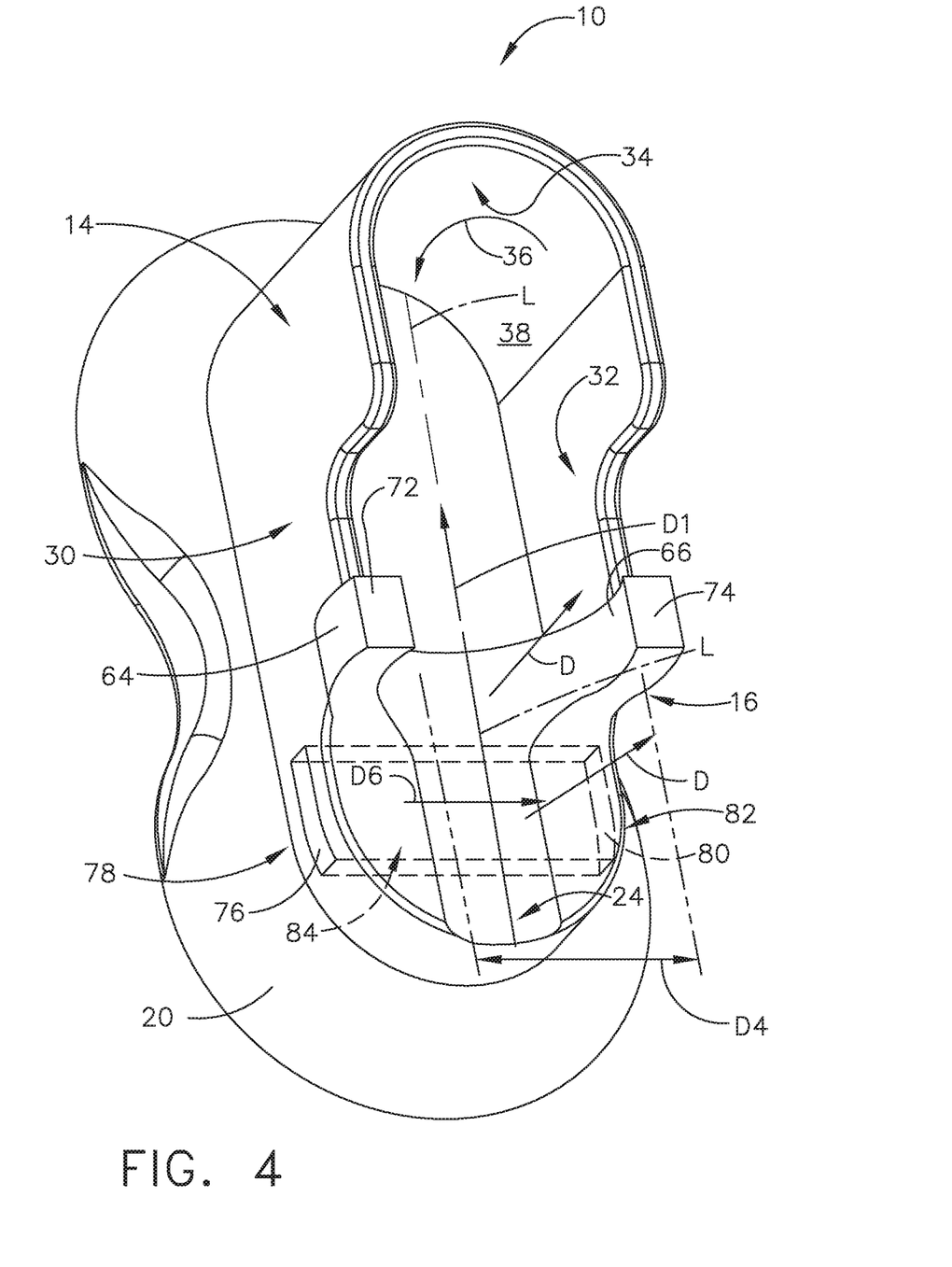
FIG. 4 is a bottom perspective view of the base member of the removable attachment assembly of FIG. 3 with the cushion member positioned on the base member.

Base member 14 is constructed of a strong material such as one of a thermoplastic, thermoset or metal. In facilitating alignment and mounting base member 14 of removable attachment assembly 10 onto ninety degree drill assembly 12, base member defines concave surface 24, as seen in FIG. 4, which faces in direction D away from cushion member 20 and which extends in direction D1 along length L of base member 14. Concave surface 24 is configured in this example to complement the shape of housing 18 to which base member 14 contacts. In this example, housing 18, which includes drive shaft portion 26 of housing 18, has a curved surface 28, as seen in FIG. 3, to which concave surface 24 has a complementary configuration for mounting of removable attachment assembly 10 so as to have a stable interface between housing 18 and base member 14. With portion of drive shaft portion 26 of housing 18, in this example, positioned within concave surface 24, base member 14 is positioned in alignment with portion of drive shaft portion 26 of housing 18.

In referring to FIG. 4, base member 14 further defines first wall portion 30 and second wall portion 32 which are spaced apart from one another. First wall portion 30 and second wall portion 32 each extend in the direction D away from cushion member 20 and first wall portion 30 and second wall portion 32 each extend in the direction D1 along length L of base member 14. Base member 14 further includes defining third wall portion 34 which connects together first wall portion 30 and second wall portion 32. In this example, third wall portion 34 extends in curvilinear direction 36. In this example, as shown in FIG. 4, first, second and third wall portions 30, 32 and 34 configure a receptacle 38 for receiving, aligning and mounting base member 14 to housing 18 of ninety degree drill assembly 12, and more particularly in this example, to mounting to main portion or drive shaft portion 26 of housing 18 and to ninety degree offset portion 40 of housing 18, as seen in FIG. 3.

Figure 2:
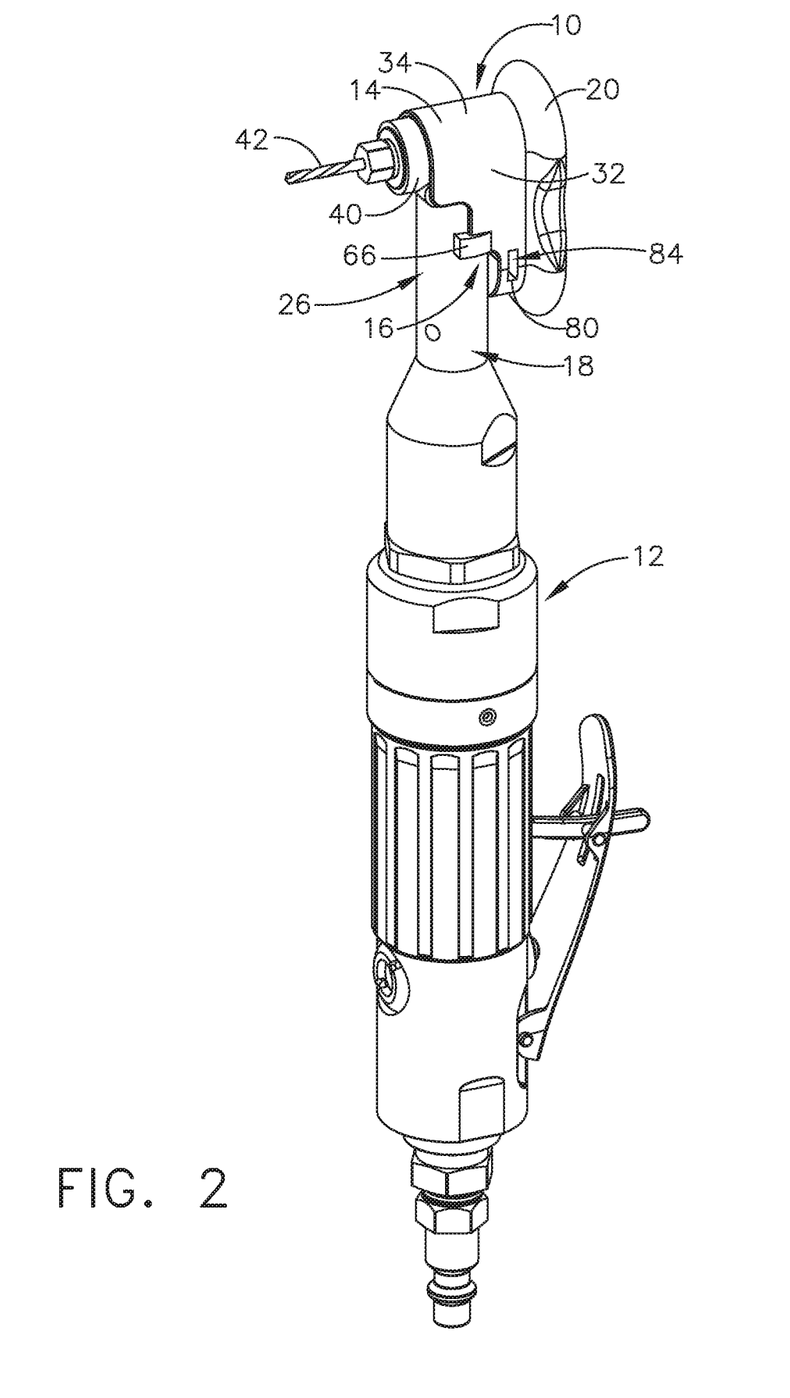
FIG. 2 is a side perspective elevation view of the ninety-degree drill assembly with the removable attachment assembly as seen in FIG. 1.

First wall portion 30 and second wall portion 32, which are spaced apart from one another, receive a main or drive shaft portion 26 of housing 18, as seen in FIGS. 1-3. Third wall portion 34 encloses a portion of ninety degree off set portion 40 of housing 18 with base member 14 mounted onto housing 18 of ninety degree drill assembly 12. With base member 14 mounted to housing 18 of ninety degree drill assembly 12, cushion member 20 is positioned between hand 22 of the operator and housing 18, as seen in FIG. 1, for drilling operations. In drilling operations, hand 22 of the operator, in this example, pushes against cushion member 20 and base member 14 in turn pushes against housing 18 urging drill bit 42 in direction D2, as seen in FIGS. 3, 6 and 8, in cutting through material (not shown) in forming a hole (not shown) in the material (not shown).

In referring to FIG. 3, base member 14 includes projection 44, which extends in direction D3 away from securement assembly 16. Projection 44, in this example, defines rim 46, which extends along perimeter 47 of the projection 44. First tab 48 of projection 44 extends away from rim 46 on a first side 50 of projection 44 and second tab 52 of projection 44 extends away from rim 46 on second opposing side 54 of projection 44. Cushion member 20 defines first recess 56 within cushion member 20 for receiving projection 44 within cushion member 20 and defines second recess 58 within first recess 56 as seen in FIGS. 3 and 7 for receiving first tab 48 and second tab 52. With positioning projection 44 within the first recess 56 first tab 48 is positioned within second recess 58 and second tab 52 is positioned within second recess 58, an interference fit is formed between first tab 48 and second recess 58 and second tab 52 and second recess 58. Second recess 58 is positioned spaced apart from bottom surface 60 of cushion member 20, wherein with first and second tabs 48, 52 positioned within second recess 58 bottom surface 60 abuts support surface 62 defined by base member 14.

Cushion member 20 is constructed of resilient material such as for example thermoplastic polyurethane material. This resilient material will maintain the interference fit of first tab 48 with second recess 58 and of second tab 52 with second recess 58. This material will provide cushion member 20 firm securement to base member 14 and allow, as needed, the operator to remove cushion member 20 from projection 44 of base member 14 without incurring damage to either cushion member 20 or base member 14. In securing cushion member 20 to projection 44, operator positions projection 44 within first recess 56 and pushes cushion member 20 and projection 44 together such that at least one of first tab 48 and second tab 52 flexes the resilient material of cushion member 20 at first portion 53 and/or second portion 55 of cushion member 20, as seen in FIG. 7, wherein first portion 53 and second portion 55 are each adjacent to second recess 58. Flexing of the resilient material in at least one of first and second portions 53, 55 permits at least one of first and second tabs 48, 52 to be positioned within second recess 58, as seen in FIG. 7 creating an interference fit. In removing cushion member 20 from projection 44, operator pulls on cushion member 20 such that at least one of first tab 48 and second tab 52 flex the resilient material of at least one of first and second portions 53, 55 of cushion member 20 adjacent second recess 58 permitting first and second tabs 48, 52 to be removed from second recess 58 overcoming the interference fit and thereafter removed from first recess 56.

Figure 5:
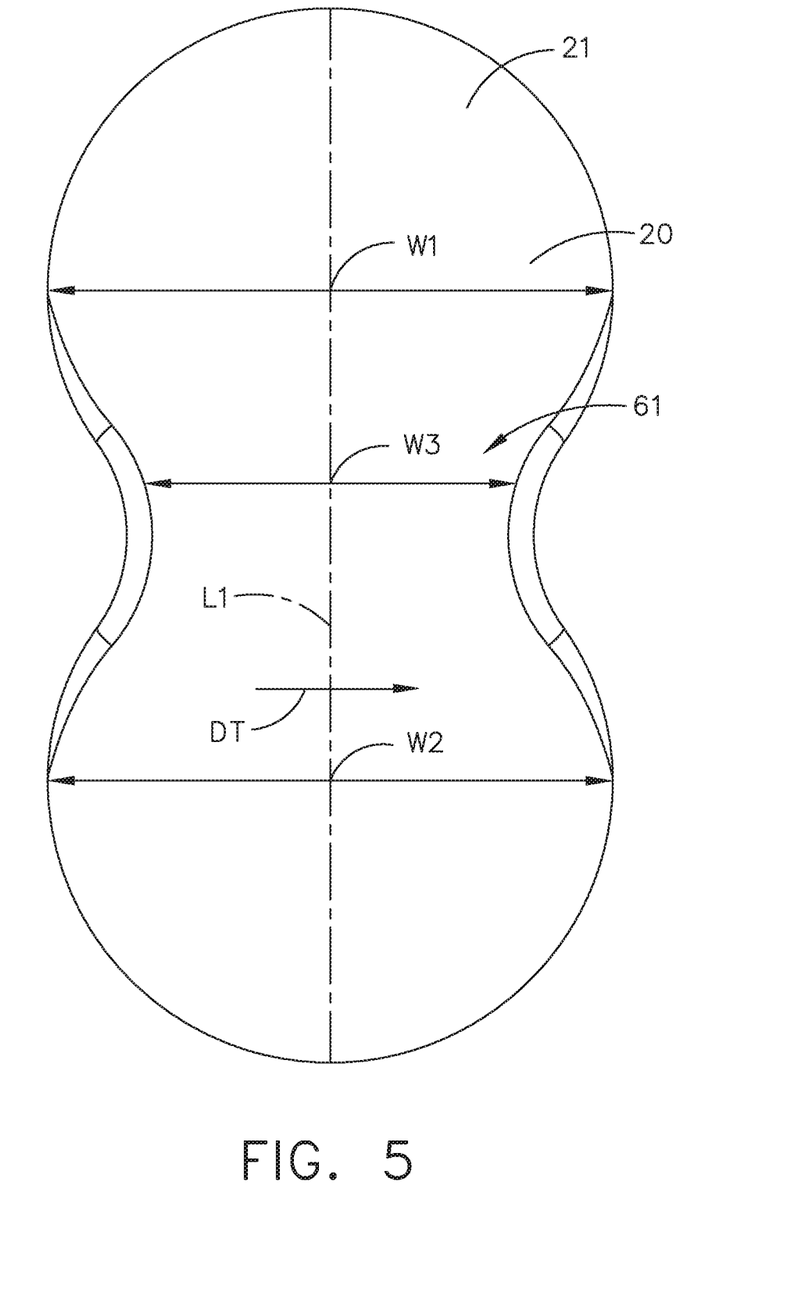
FIG. 5 is a top plan view of the cushion member of the removable attachment assembly of FIG. 3.

In referring to FIG. 5, cushion member 20 includes first width dimension W1 and second width dimension W2 which each extends in transverse direction DT relative to length L1 of cushion member 20 and are spaced apart along length L1 of cushion member 20 from one another. Third width dimension W3 of cushion member 20 extends in transverse direction DT relative to length L1 of cushion member 20 and is positioned spaced apart from and in between the first width dimension W1 of cushion member 20 and second width dimension W2 of cushion member 20 wherein third width dimension W3 is less than each of first and second width dimensions W1, W2. This varying width configuration of cushion member 20 provides for a lesser width dimension in a central portion 61 of cushion member 20 as seen in FIG. 5. This reduction of width dimension in central portion 61 of cushion member 20 provides operator ease in straddling, for example, a thumb and an index finger of an operator on either side of cushion member 20 in order to hold a drill guide (not shown) which may be used for a drilling operation with ninety degree drill assembly 12. The narrowed central portion 61 of cushion member 20 permits the operator to comfortably hold a drill guide with for example a thumb and an index finger straddling cushion member 20 at central portion 61 and at the same time use a remainder portion of the same hand of the operator to apply a pushing force against cushion member 20 during the drilling operation.

Securement assembly 16, as seen in FIGS. 4 and 7, in this example, includes first arm member 64 and second arm member 66, which extend in direction D away from cushion member 20. First arm member 64 has a first curvilinear configuration 68 and the second arm member 66 has a second curvilinear configuration 70. First arm member 64 and second arm member 66, in this example, are each constructed of one of a thermoplastic, thermoset or metal material, which provides resilience to first and second arm members 64, 66 such that first and second arm members 64, 66 can move in and out of an interference fit with housing 18, as described below.

With first and second arm members 64, 66 not engaged to housing 18 of ninety degree drill assembly 12, as shown in FIG. 4 and as shown in phantom in FIG. 7, first free end 72 of first arm member 64 and second free end 74 of second arm member 66 are positioned spaced apart first distance D4, as seen in FIG. 7. With insertion of the housing 18 between first arm member 64 and second arm member 66, first free end (designated as) 72' and second free end (designated as) 74' are then spaced apart a second distance D5, which is a greater distance than first distance D4, which results in first and second arm members 64, 66 exerting a compressive force F onto housing 18 providing an interference fit between housing 18 and first and second arm members 64, 66.

In referring to FIG. 4, base member 14 defines first opening 76 positioned on first side 78 of base member 14 and second opening 80 positioned on opposing second side 82 of base member 14. Base member 14 defines slot 84 which extends through base member 14 from first opening 76 to second opening 80 such that slot 84 is accessible from first opening 76 and from second opening 80. Slot 84 extends, in this example, in direction D6 transverse to length L of base member 14 as seen in FIG. 4. Slot 84, as will be discussed herein, is utilized in conjunction with zip tie member 90, as seen in FIG. 6, for additional securement of base member 14 to housing 18. Additionally, slot 84 can facilitate securement of lanyard member 92, as seen in FIG. 8, for preventing removal attachment assembly 10 from being separated from ninety degree drill assembly 12 and become unwanted debris within the structure being fabricated such as an aircraft.

Figure 9:
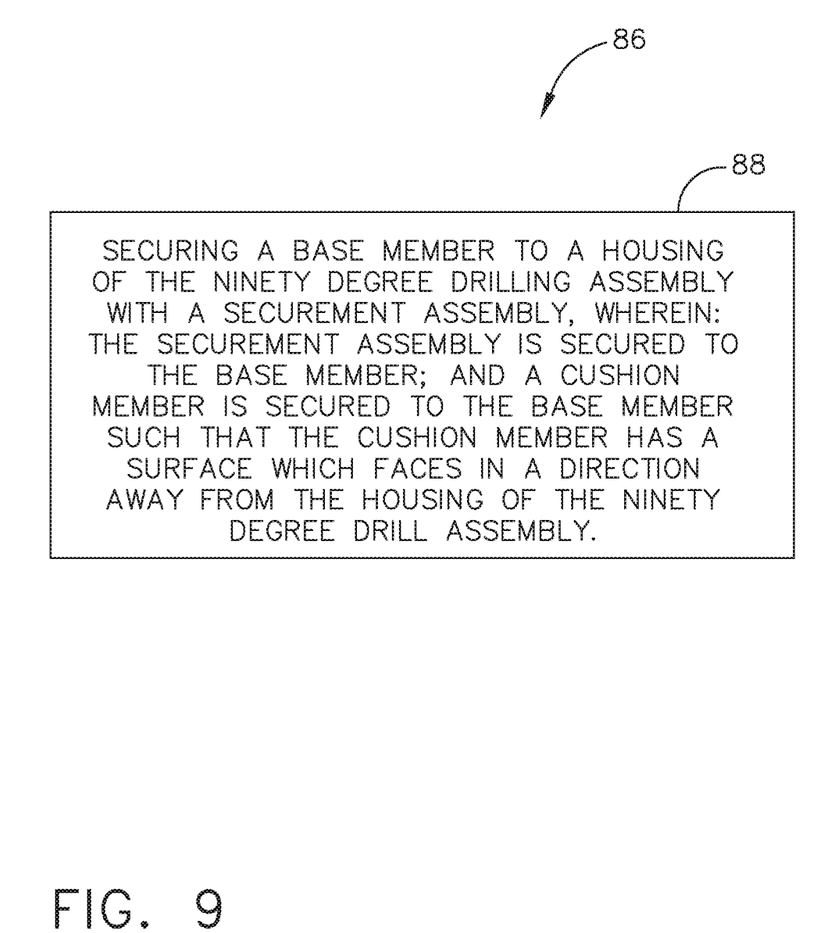
FIG. 9 is a flow chart of a method for installing a removable attachment assembly to a ninety-degree drill assembly.

In referring to FIG. 9, method 86 for installing removable attachment assembly 10 to a ninety degree drill assembly 12 includes step 88 of securing base member 14 to housing 18 of the ninety degree drill assembly 12 with securement assembly 16. Securement assembly 16 is secured to base member 14. Cushion member 20 is secured to base member 14 such that cushion member 20 has surface 21 which faces direction D7 away from housing 18, as seen in FIG. 7. With surface 21 of cushion member 20 positioned facing in direction D7 away from housing 18, cushion member 20 provides operator's hand cushioning, with operator's hand 22 pushing against surface 21 of cushion member 20 and operator urging drill bit 42 through material of hole being drilled during operation of ninety degree drill assembly 12.

Cushion member 20 can be easily replaced by the operator with base member 14 having projection 44 which extends in direction D3 away from securement assembly 16, as seen in FIG. 3. Projection 44, in this example as described above, defines rim 46, which extends along perimeter 47 of the projection 44. First tab 48 of projection 44 extends away from rim 46 on a first side 50 of projection 44 and second tab 52 of projection 44 extends away from rim 46 on second opposing side 54 of projection 44. Cushion member 20 defines first recess 56 within the cushion member for receiving projection 44 and defines second recess 58 for receiving first tab 48 and second tab 52, as seen in FIG. 7, such that with positioning projection 44 within the first recess 56, first tab 48 is positioned in second recess 58 and second tab 52 is positioned in second recess 58 forming an interference fit between first tab 48 and second recess 58 and second tab 52 and second recess 58. Second recess 58 is positioned spaced apart from bottom surface 60 of cushion member 20, wherein with first and second tabs 48, 52 positioned within second recess 58 bottom surface 60 abuts support surface 62 defined by base member 14.

Cushion member 20 is constructed of resilient material such as for example thermoplastic polyurethane material. This resilient material will maintain the interference fit of first tab 48 with second recess 58 and of second tab 52 with second recess 58. This material will provide cushion member 20 firm securement to base member 14 and will allow, as needed, the operator to remove cushion member 20 from projection 44 of base member 14 without incurring damage to either cushion member 20 or base member 14. As mentioned earlier, in securing cushion member 20 to projection 44, operator positions projection 44 within first recess 56 and pushes cushion member 20 and projection 44 together such that at least one of first tab 48 and second tab 52 flexes the resilient material of cushion member 20 at first portion 53 and/or second portion 55 of cushion member 20, as seen in FIG. 7, wherein first portion 53 and second portion 55 are each adjacent to second recess 58. Flexing of the resilient material in at least one of first and second portions 53, 55 permits at least one of first and second tabs 48, 52 to be positioned within second recess 58, as seen in FIG. 7, creating an interference fit. In removing cushion member 20 from projection 44, operator pulls on cushion member 20 such that at least one of first tab 48 and second tab 52 flex the at least one of first portion and second portion 53, 55 of the resilient material of cushion member 20 adjacent second recess 58 permitting first and second tabs 48, 52 to be removed from second recess 58 overcoming the interference fit and thereafter removed from first recess 56.

Method 86 for installing removable attachment assembly 10 to ninety degree drill assembly 12, as seen in FIG. 6, further includes positioning zip tie member 90 to extend through first opening 76 defined on first side 78 of base member 14 and through second opening 80 defined on second side 82, as seen in FIG. 4, of base member 14. Further securing removable attachment assembly 10 to ninety degree drill assembly 12 further includes positioning zip tie member 90 about housing 18 of ninety degree drill assembly 12, as seen in FIG. 6, and cinching zip tie member 90 securely together against housing 18.

In the interest of operator not losing or misplacing removable attachment assembly 10 and removable attachment assembly 10 possibly becoming unwanted debris within the structure being fabricated, method 86 for installing removable attachment assembly 10 to a ninety degree drill assembly 12 further includes positioning lanyard member 92, as seen in FIG. 8, through first opening 76 defined on first side 78 of base member 14 and through second opening 80 defined on second side 82, as seen in FIG. 4, of base member 14. Positioning lanyard member 92 further includes securing lanyard member 92 to ninety degree drill assembly 12 with positioning lanyard member 92 about housing 18 of ninety degree drill assembly 12 and tying, in this example, securement knot 94. Lanyard member 92 will keep removable attachment assembly 10 tied to ninety degree drill assembly 12 and prevent removable attachment assembly 10 from becoming unwanted debris within the structure being fabricated.

A second example of a removable attachment assembly 96 is associated with a forty five degree drill assembly 98, as seen in FIGS. 10-12. As seen in FIG. 10, drill bit 42, which is supported within an offset portion 17 of housing 18', extends from a main or drive shaft portion 26' of housing 18' and is angularly positioned forty five degrees relative to housing 18', as represented by angle "B". In referring to FIGS. 10-12 removable attachment assembly 96 for a forty five degree drill assembly 98 includes base member 14'. Base member 14' includes first curved wall portion 100 for receiving first portion 102 of housing 18' which is a main or drive shaft portion 26' of housing 18'. Base member 14' also includes second curved wall portion 104 for receiving second portion 106 of housing 18', which is a forty five degree offset portion 17 from main or drive shaft portion 26' of housing 18'. First and second curved wall portions 102 and 104 are configured to compatibly receive a curved surface 28' of housing 18'. Second curved wall portion 104 extends forty five degrees relative to first curved wall portion 102 as similarly represented by angle "B" between that of drill bit 42 relative to main portion 26' of housing 18'.

Removable attachment assembly 96 includes securement assembly 16'. Securement assembly 16' includes first tab member 105 and second tab member 108 each extending from first curved wall portion and second curved wall portion and positioned spaced apart from one another. First tab member 105 defines first curved wall member (not shown in FIG. 11, but seen in cross section in FIG. 12 as 110) and second tab member 108 defines second curved wall member 112, as seen in FIGS. 11 and 12. First curved wall member 110 of first tab member 105 faces second curved wall member 112 with first curved wall member 110 engaging first projection portion 114 which extends from housing 18' and second curved wall member 112 engages second projection portion 116 which extends from housing 18', which results in releasably securing base member 14' to housing 18'. First projection portion 114 and second projection portion 116 are movable into and out of engagement with first curved wall member 110 and second curved wall member 112, without first curved wall member 110 and second curved wall member 112 forming closed curved wall formations.

Removable attachment assembly 96 includes third tab member 118 positioned between and secured to first curved wall portion 100 and second curved wall portion 104, as seen in FIG. 11 and which extends away from second curved wall portion 104 angularly at ninety degrees with respect to second curved wall portion 104, as represented by angle "C". Cushion member 120 overlies third tab member 118 providing cushioning for the user as the user applies a force to third tab member 118 aligned with drill bit 42 in a drilling operation.

With respect to first example of removable attachment assembly 10 and second example of removable attachment assembly 96, each provides comfort to the user with a cushion member in applying a force aligned with the drill bit. The application of the aligned force with the drill bit provides a more desirable outcome for the hole being cut. Additionally, each example provides protection of the structure being fabricated with the cushioned member should backing out of a drilling operation take place in a confined location of fabrication or the angular drilling assembly otherwise bumps into or is dropped onto the structure being fabricated.

While various embodiments have been described above, this disclosure is not intended to be limited thereto. Variations can be made to the disclosed embodiments that are still within the scope of the appended claims.

What is claimed:

1. A removable attachment assembly for an angular drill assembly including a housing having a proximal end portion and a distal end portion disposed angularly relative to each other to define an angular joint therebetween, the removable attachment assembly comprising:

a base member;
a securement assembly extending outwardly from the base member and configured to attach to the housing to secure the base member to the housing and configured to detach from the housing to disconnect the base member from the housing, wherein the securement assembly includes a first member and a second member spaced apart from each other, and each of the first member and the second member partially surround the housing; and
a cushion member associated with the base member such that at least a portion of the cushion member overlies the securement assembly which aligns the cushion member over the angular joint of the housing.

2. The removable attachment assembly of claim 1, wherein the cushion member includes an attachment side engaging the base member to secure the cushion member to the base member, and the cushion member includes a cushioning side opposing the attachment side which faces away from the base member.

3. The removable attachment assembly of claim 2, wherein the base member defines a concave surface which faces in a direction away from the cushion member and which extends in a direction along a length of the base member.

4. The removable attachment assembly of claim 2, wherein the base member further defines a first wall portion and a second wall portion which are spaced apart from one another, wherein:
the first wall portion and the second wall portion each extend in a direction away from the cushion member; and
the first wall portion and the second wall portion each extend in a direction along a length of the base member.

5. The removable attachment assembly of claim 4, further including a third wall portion which connects together the first and second wall portions.

6. The removable attachment assembly of claim 5, wherein the third wall portion extends in a curvilinear direction.

7. The removable attachment assembly of claim 2, wherein the first member is further defined a first arm member and the second member is further defined as a second arm member, and wherein the first arm member and the second arm member extend in a direction away from the cushion member.

8. The removable attachment assembly of claim 7, wherein the first arm member has a first curvilinear configuration and the second arm member has a second curvilinear configuration.

9. The removable attachment assembly of claim 8, wherein:
a first free end of the first arm member and a second free end of the second arm member are positioned spaced apart a first distance; and
the first free end and the second free end are spaced apart a second distance when the housing is disposed between the first arm member and the second arm member, wherein the second distance is a greater distance than the first distance, and the first and second arm members exert a compressive force onto the housing to provide an interference fit between the housing and the first and second arm members.

10. The removable attachment assembly of claim 2, wherein:
the base member includes a projection which extends in a direction away from the securement assembly; and
the cushion member defines a recess facing the projection, such that the projection is disposed inside of the recess to create an interference fit therebetween to attach together the cushion member and the base member.

11. The removable attachment assembly of claim 2, wherein the cushion member comprises:
a first width dimension of the cushion member and a second width dimension of the cushion member which each extend in a transverse direction relative to a length of the cushion member and are spaced apart along the length of the cushion member from one another; and
a third width dimension of the cushion member extends in the transverse direction relative to the length of the cushion member and is positioned spaced apart from and in between the first width dimension of the cushion member and the second width dimension of the cushion member, wherein the third width dimension is less than each of the first and second width dimensions.

12. The removable attachment assembly of claim 1, wherein the base member includes:
a first curved wall portion for receiving the proximal end portion of the housing;
a second curved wall portion for receiving the distal end portion of the housing; and
the second curved wall portion extends angularly forty-five degrees from the first curved wall portion.

13. The removable attachment assembly of claim 12, wherein:
the first member is further defined as a first tab member and the second member is further defined as a second tab member, and each of the first tab member and the second tab member extends from the first curved wall portion and the second curved wall portion;
the first tab member defines a first curved wall member and the second tab member defines a second curved wall member; and
the first curved wall member faces the second curved wall member with the first curved wall member engaging a first projection portion which extends from the housing and the second curved wall member engages a second projection portion which extends from the housing, releasably securing the base member to the housing.

14. The removable attachment assembly of claim 12, further including a third tab member positioned between and secured to the first curved wall portion and the second curved wall portion and which extends away from the second curved wall portion angularly at ninety degrees with respect to the second curved wall portion.

15. The removable attachment assembly of claim 14, wherein the cushion member overlies the third tab member.

16. The removable attachment assembly of claim 1, wherein the cushion member is attached to the base member such that at least a portion of the base member is disposed between the cushion member and the securement assembly.

17. The removable attachment assembly of claim 16, further including a drill bit attachable to a distal end of the housing, wherein at least a portion of the base member is disposed between the drill bit and the cushion member.

18. The removable attachment assembly of claim 17, wherein the distal housing portion extends at ninety degrees with respect to the proximal housing portion, and the distal housing portion includes the distal end, and wherein the drill bit extends outwardly from the distal end of the distal housing portion at ninety degrees with respect to the proximal housing portion.

19. The removable attachment assembly of claim 17, wherein at least a portion of the cushion member and a portion of the base member each align with the drill bit.

20. The removable attachment assembly of claim 17, wherein the distal housing portion extends at forty-five degrees with respect to the proximal housing portion, and the distal housing portion includes the distal end, and wherein the drill bit extends outwardly from the distal end of the distal housing portion at forty-five degrees with respect to the proximal housing portion.

21. The removable attachment assembly of claim 1, wherein:
the base member includes a first surface facing the cushion member and a second surface opposing the first surface;
the second surface of the base member defines a receptacle that is open in a first direction;
the first member and the second member each extend outwardly from the base member away from the first surface, wherein the first member and the second member are spaced apart from each other to define an opening therebetween, and the opening faces in a same direction as the receptacle of the base member such that the opening is open in the first direction; and
the housing is disposed in the receptacle of the base member and the opening between the first member and the second member such that the base member partially surrounds the housing and the first member and the second member partially surrounds the housing in the same direction as the base member which attaches the housing to the base member such that one side of the housing is exposed outside of the receptacle and the opening.

22. A method for installing a removable attachment assembly to an angular drilling assembly, the method comprising:
attaching a securement assembly to a housing of the angular drilling assembly to secure a base member to the housing, wherein:
the securement assembly extends outwardly from the base member, and the securement assembly is also configured to detach from the housing to disconnect the base member from the housing, wherein the securement assembly includes a first member and a second member spaced apart from each other, and each of the first member and the second member partially surround the housing;
the housing includes a proximal end portion and a distal end portion disposed angularly relative to each other to define an angular joint therebetween; and
a cushion member associated with the base member such that at least a portion of the cushion member overlies the securement assembly which aligns the cushion member over the angular joint of the housing, and the cushion member has a cushioning surface which faces in a direction away from the housing.

23. The method for installing of claim 22, wherein:
the base member includes a projection which extends in a direction away from the securement assembly;
the projection defines a rim extending along a perimeter of the projection and a first tab extending away from the rim on a first side of the projection and a second tab extending away from the rim on a second opposing side of the projection; and
the cushion member defines a first recess within the cushion member for receiving the projection and defines a second recess for receiving the first tab within the second recess and the second tab within the second recess such that with positioning the projection within the first recess, the first tab is positioned in the second recess and the second tab is positioned in the second recess forming an interference fit between the first tab and the second recess and between the second tab and the second recess.

24. The method for installing of claim 22, further including:
positioning a zip tie member to extend through a first opening defined on a first side of the base member and through a second opening defined on a second side of the base member; and
positioning the zip tie member about the housing.

25. The method for installing of claim 22, further including:
positioning a lanyard member through a first opening defined on a first side of the base member and through a second opening defined on a second side of the base member; and
securing the lanyard member to the angular drill assembly.

26. A removable attachment assembly for an angular drill assembly including a housing and a drill bit coupleable to the housing, the removable attachment assembly comprising:
a base member;
a securement assembly secured to the base member for releasably securing the base member to the housing, wherein the drill bit extends outwardly at ninety degrees with respect to the housing;
wherein the base member includes a projection which extends in a direction away from the securement assembly, and the projection defines a rim which extends along a perimeter of the projection;
the projection includes a first tab that extends away from the rim on a first side of the projection and a second tab that extends away from the rim on a second opposing side of the projection; and
a cushion member associated with the base member, and the cushion member defines a first recess within the cushion member for receiving the projection within the cushion member and defines a second recess within the first recess for receiving the first tab within the second recess and receiving the second tab within the second recess with positioning the projection within the first recess, wherein with the first tab positioned within the second recess and the second tab positioned within the second recess, an interference fit is created between the first tab and the second recess and between the second tab and the second recess with the cushion member releasably secured to the base member.

* * * * *

UNITED STATES PATENT AND TRADEMARK OFFICE
CERTIFICATE OF CORRECTION

| | |
|---|---|
| PATENT NO. | : 11,780,016 B2 |
| APPLICATION NO. | : 16/698526 |
| DATED | : October 10, 2023 |
| INVENTOR(S) | : Ryan L. Blake and Ryan D. Jennings |

It is certified that error appears in the above-identified patent and that said Letters Patent is hereby corrected as shown below:

In the Claims

Claim 7, Column 9, Lines 42-43: "defined a first arm member" should read --defined as a first arm member--

Signed and Sealed this
Twentieth Day of August, 2024

*Katherine Kelly Vidal*

Katherine Kelly Vidal
*Director of the United States Patent and Trademark Office*